United States Patent
Bourgeois

(10) Patent No.: US 7,387,850 B2
(45) Date of Patent: Jun. 17, 2008

(54) OXIDANT AND FUEL DISTRIBUTION FOR A FUEL CELL ASSEMBLY

(75) Inventor: Richard Scott Bourgeois, Albany, NY (US)

(73) Assignee: General Electric Company, Niskayuna, NY (US)

(*) Notice: Subject to any disclaimer, the term of this patent is extended or adjusted under 35 U.S.C. 154(b) by 716 days.

(21) Appl. No.: 10/750,463

(22) Filed: Dec. 31, 2003

(65) Prior Publication Data
US 2005/0142419 A1    Jun. 30, 2005

(51) Int. Cl.
*H01M 8/04* (2006.01)
(52) U.S. Cl. .......................... 429/34
(58) Field of Classification Search ............. 429/20, 429/34
See application file for complete search history.

(56) References Cited

U.S. PATENT DOCUMENTS

| | | | |
|---|---|---|---|
| 4,943,494 A * | 7/1990 | Riley | 429/30 |
| 5,169,730 A * | 12/1992 | Reichner et al. | 429/20 |
| 5,532,072 A | 7/1996 | Spaeh et al. | |
| 6,653,012 B2 * | 11/2003 | Suzuki et al. | 429/39 |
| 6,764,784 B2 * | 7/2004 | Gillett et al. | 429/17 |

FOREIGN PATENT DOCUMENTS

EP    1300902    * 4/2003

* cited by examiner

Primary Examiner—Mark Ruthkosky
(74) Attorney, Agent, or Firm—Patrick K. Patnode; Curtis B. Brueske

(57) ABSTRACT

An oxidant distribution system for a fuel cell assembly includes a fuel cell having at least one oxidant inlet and at least one oxidant outlet, a housing surrounding the fuel cell and an insulation layer positioned between the housing and the fuel cell. The insulation layer defines a cavity adjacent to the oxidant inlet for channeling oxidant flow to the oxidant inlet. A fuel distribution system for a fuel cell assembly including similar features is also disclosed.

20 Claims, 6 Drawing Sheets

OXIDANT AND FUEL DISTRIBUTION FOR A FUEL CELL ASSEMBLY

BACKGROUND OF THE INVENTION

The present invention relates generally to fuel cell assemblies and, more particularly, to the oxidation and fuel distribution to fuel cells, such as solid oxide fuel cells.

A fuel cell is an energy conversion device that produces electricity by electrochemically combining a fuel and an oxidant across an ionic conducting layer. One typical construction of a high temperature fuel cell bundle is an array of axially elongated tubular shaped connected fuel cells and associated fuel and air distribution equipment. Other fuel cell constructions include planar fuel cells comprising flat single members. Exemplary planar fuel cells include counter-flow, cross-flow and parallel flow varieties. The members of a typical planar fuel cell comprise tri-layer anode/electrolyte/cathode components that conduct current from cell to cell and provide channels for gas flow into a cubic structure or stack.

Fuel cell stacks, such as solid oxide fuel cell stacks, have demonstrated a potential for high efficiency and low pollution in power generation. In a solid oxide fuel cell, upon electrochemically combining a fuel and an oxidant across an ionic conducting layer, an oxygen ion ($0^{2-}$) transported across the electrolyte produces a flow of electrons to an external load.

Oxidant, generally air, performs two main functions in the fuel cell stack. As discussed above, the oxidant electrochemically reacts with fuel to generate electric power. In addition, the oxidant is utilized to remove excess heat away from the cell. The waste heat generated in a solid oxide fuel cell at its operating temperature of about 600° C. to about 1300° C. is typically removed via the oxidant to maintain a desired temperature level of the fuel cell components, such as the anode, cathode and electrolyte.

For the stack to operate at maximum efficiency, all of the cells in the stack should operating at substantially the same operating temperature and have substantially the same reaction rate. In order to achieve this maximum efficiency, each cell requires about an equal amount of oxidant and fuel to be delivered.

Accordingly there is a need in the art to have an improved oxidant and fuel distribution system that can consistently deliver oxidant and fuel to the entire cell.

BRIEF SUMMARY OF THE INVENTION

An oxidant distribution system for a fuel cell assembly includes a fuel cell having at least one oxidant inlet and at least one oxidant outlet, a housing surrounding the fuel cell and an insulation layer positioned between the housing and the fuel cell. The insulation layer defines a cavity adjacent to the oxidant inlet for channeling oxidant flow to the oxidant inlet. A fuel distribution system for a fuel cell assembly including similar features is also disclosed.

These and other aspects, advantages, and salient features of the present invention will become apparent from the following detailed description, the accompanying drawings, and the appended claims.

DETAILED DESCRIPTION OF THE INVENTION

Figure 1:
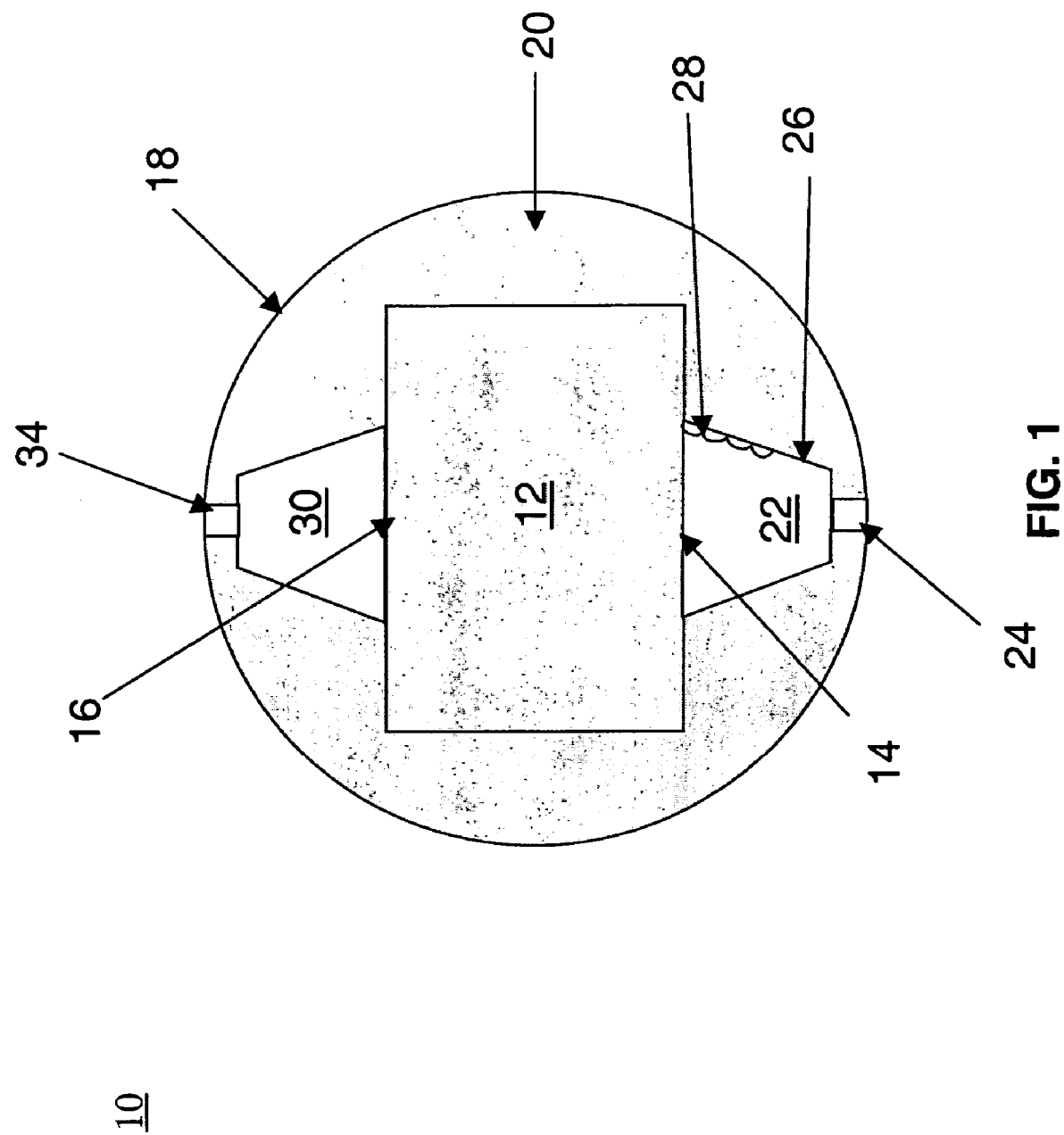
FIG. 1 is a schematic illustration of an oxidant distribution system in accordance with one embodiment of the invention.
Figure 2:
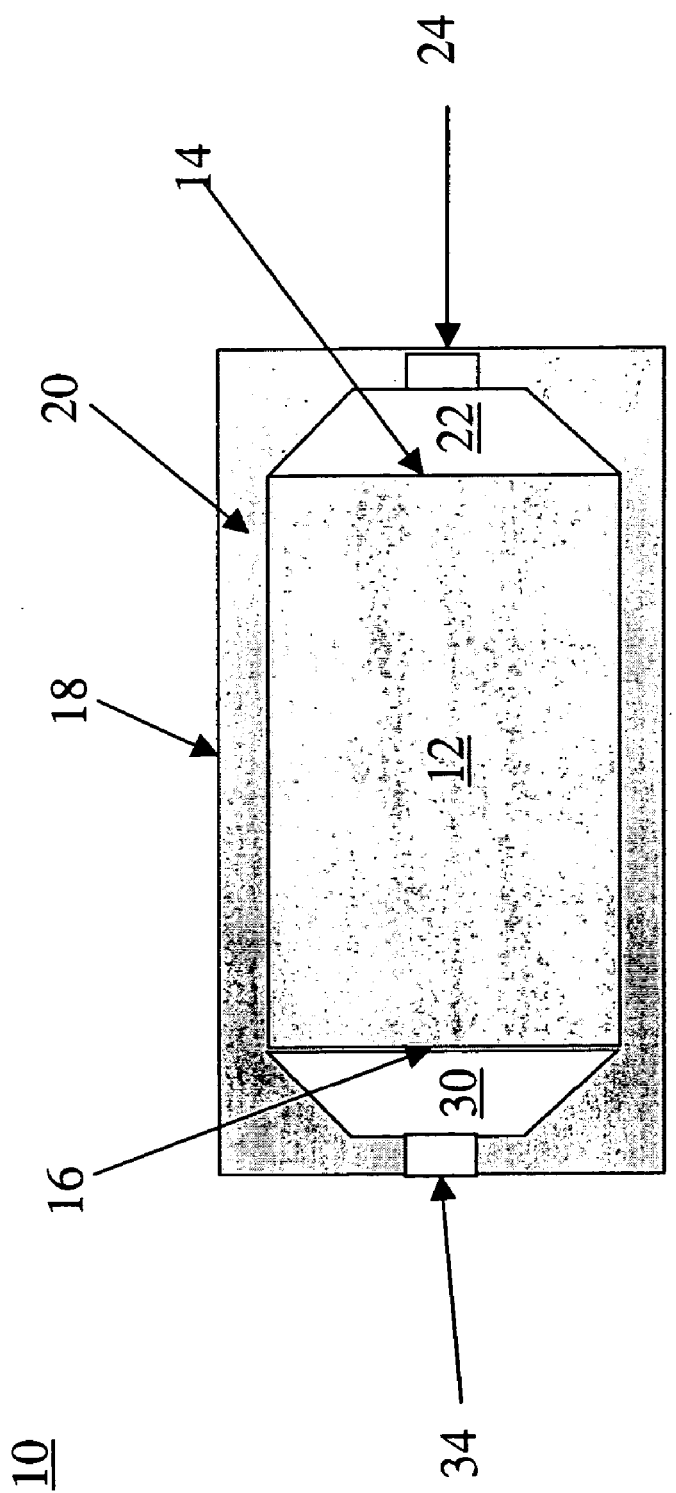
FIG. 2 is a schematic illustration of a side view of an oxidant distribution system of FIG. 1, in accordance with one embodiment of the invention.

An oxidant distribution system 10 for a fuel cell assembly comprises a fuel cell 12, such as a solid oxide fuel cell, having at least one oxidant inlet 14 and at least one oxidant outlet 16, as shown in FIG. 1 and FIG. 2. A housing 18 surrounds the fuel cell 12 and bounds an insulation layer 20 that is positioned between the housing 18 and the fuel cell 12. Typically, insulation layer 20 comprises a rigid refractory material, such as a ceramic.

The insulation layer 20 defines at least a first cavity 22 adjacent to the at least one oxidant inlet 14 for channeling oxidant flow to the at least one oxidant inlet 14 from an oxidant supply feed 24.

In one embodiment, first cavity 22 is shaped such that a portion of first cavity 22 adjacent to the oxidant supply feed 24 substantially mates with said supply feed 24 and a second portion of first cavity 22 adjacent to the oxidant inlet 14 substantially mates with the oxidant inlet 14. Accordingly, the insulation layer 20 abuts or comes up adjacent to the oxidant supply feed 24 and abuts or comes up adjacent to the oxidant inlet 14, thereby defining first cavity 22. Typically, the cross-section of first cavity 22 at the oxidant inlet 14 is greater than the cross-sectional size of the first cavity 22 at the oxidant supply feed 24 thereby creating a diffuser effect that distributes oxidant more uniformly to the oxidant inlet 14 of the fuel cell 12. In one embodiment of the invention, an internal surface 26 of first cavity 22 is roughened 28 to enhance turbulent flow therethrough.

Oxidant distribution system 10 further comprises a second cavity 30 defined by insulation layer 20 adjacent to the at least one oxidant outlet 16 for channeling oxidant flow from the oxidant outlet 16 to an oxidant exit port 32. The second cavity 30 is shaped such that a first portion of the second cavity 30 adjacent to the oxidant exit port 32 substantially mates with said exit port 32 and a second portion of said second cavity 30 adjacent to the oxidant outlet 16 substantially mates with the oxidant outlet 16 so as to channel oxidant flow from said fuel cell 12. In one embodiment, the cross-sectional size of said first portion of the second cavity 30 is greater than the cross-sectional size of the second portion thereby creating a reducer effect as the oxidant exits the oxidant outlet 16 of said fuel cell 12.

The advantages of this oxidant distribution system 10 are numerous. By using the insulation layer 20 as the oxidant distributor, the system has an overall reduction in the number of parts required. Additionally, by eliminating an additional air distributor, more insulation can be packed into a given housing 18 improving the overall efficiency of the system. Moreover, the use of the insulating layer 20 as the oxidant supply flow path also allows the oxidant leaving the first cavity 22 to retain more of its heat and creates efficiency advantages in certain system configurations.

Figure 3:
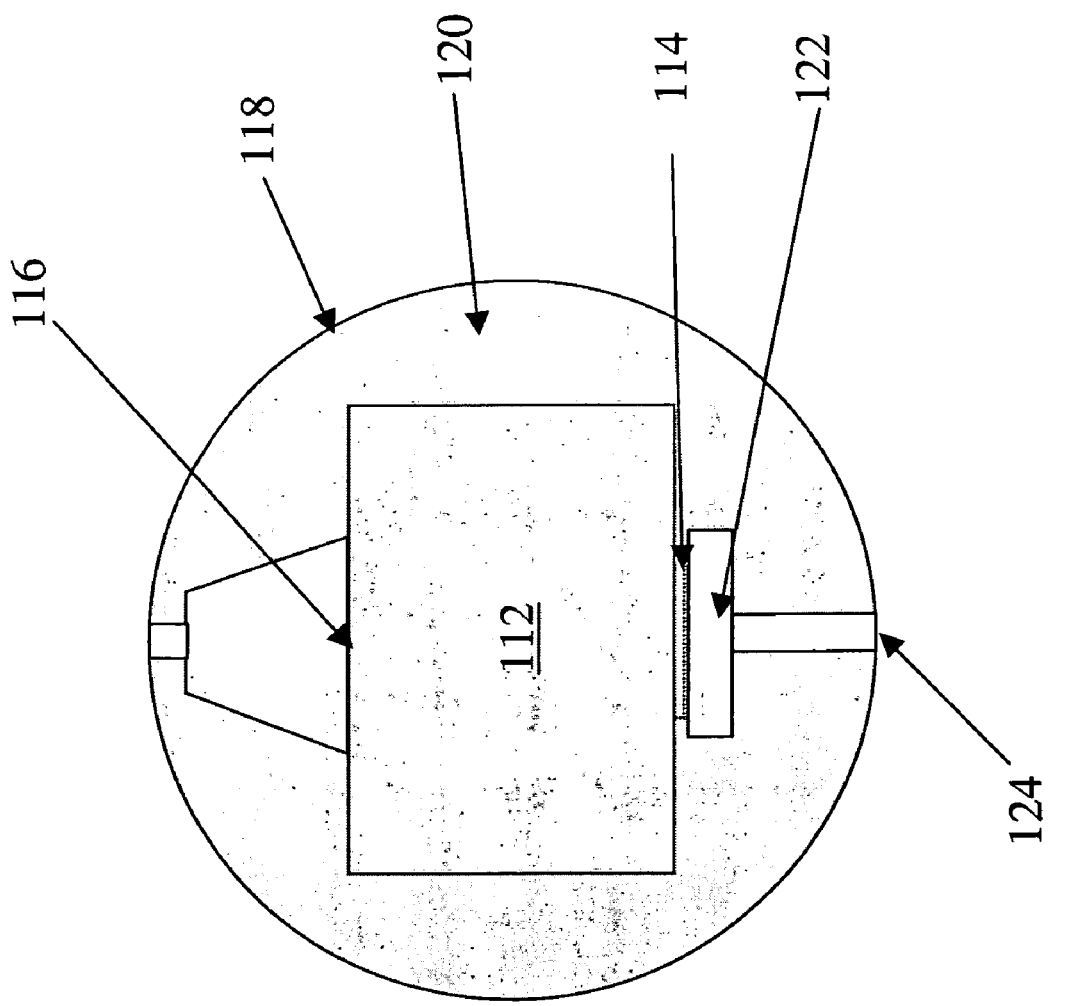
FIG. 3 is a schematic illustration of an oxidant distribution system in accordance with another embodiment of the invention.
Figure 4:
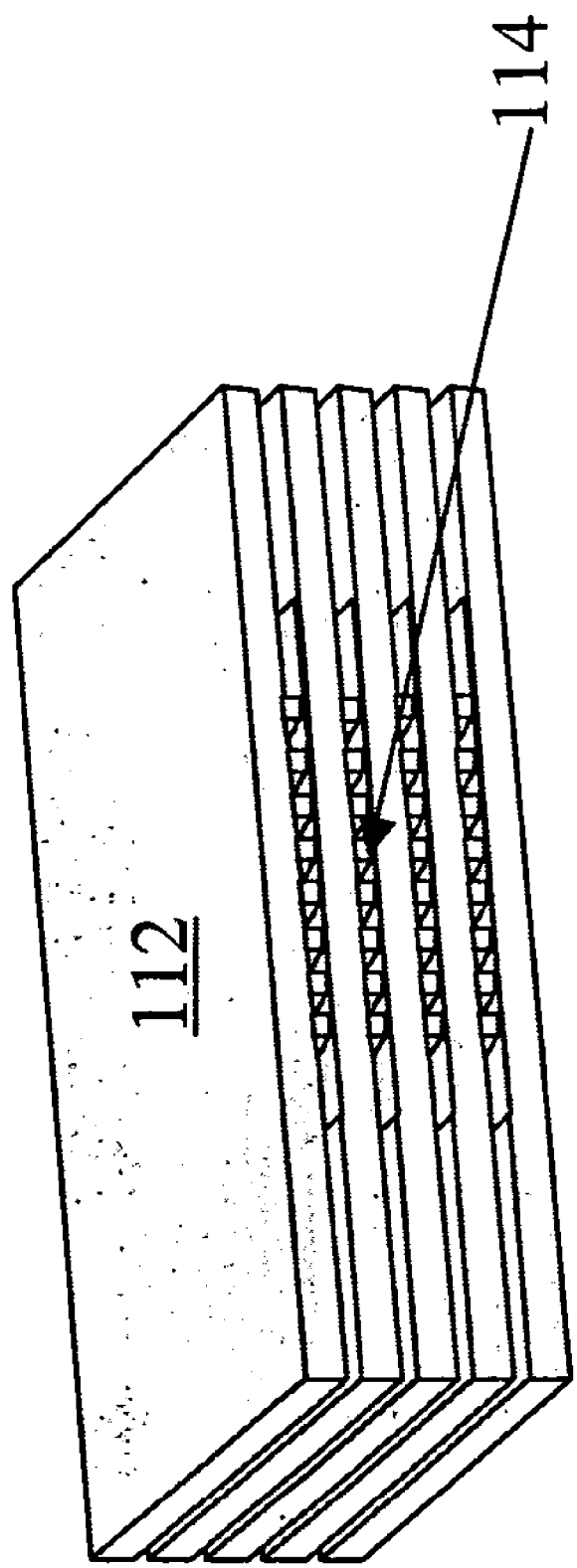
FIG. 4 is a isometric view of a fuel cell.
Figure 5:
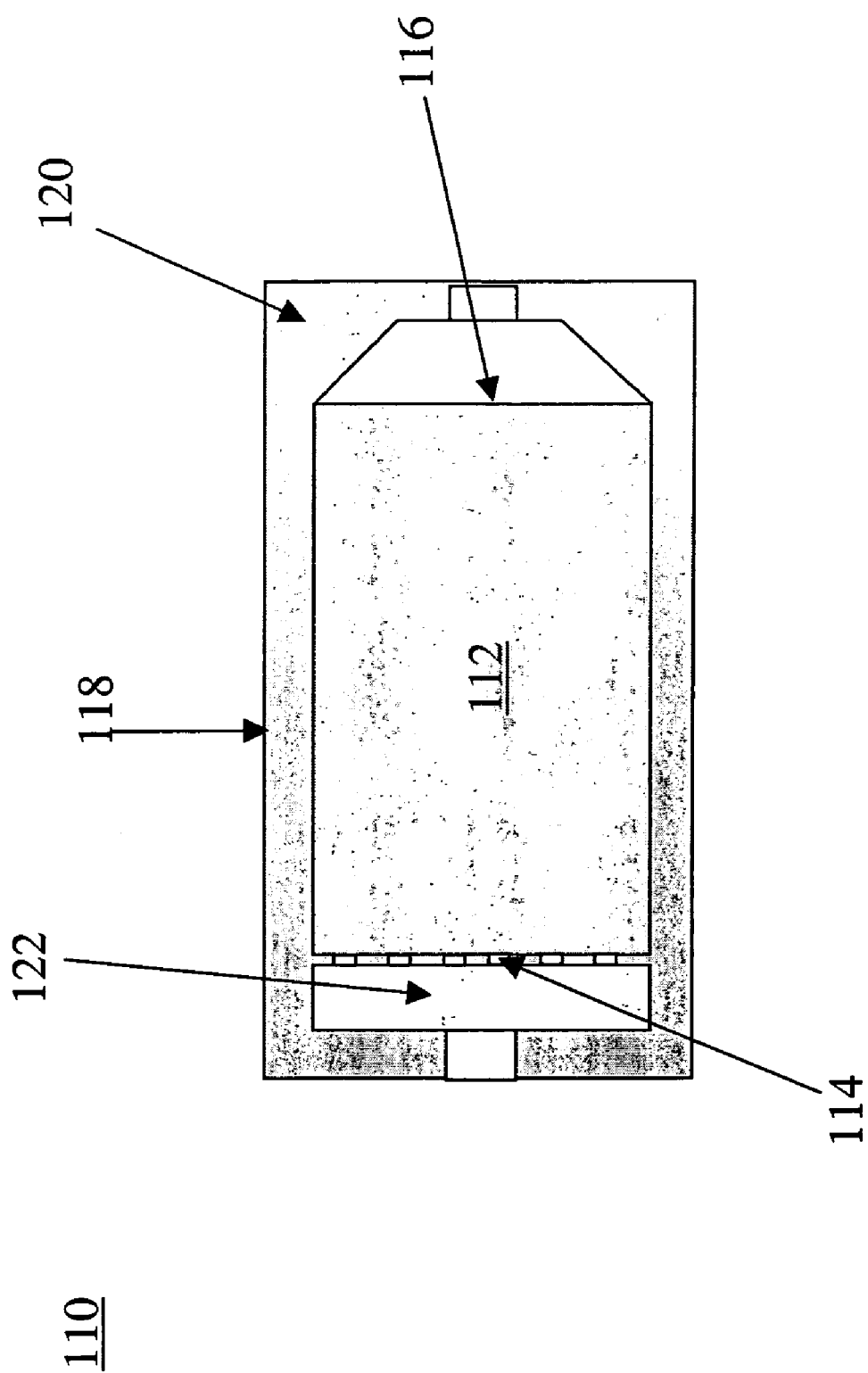
FIG. 5 is a schematic illustration of a side view of an oxidant distribution system of FIG. 3, in accordance with one embodiment of the invention.

Another embodiment of an oxidant distribution system 100 for a fuel cell assembly comprises a fuel cell 112, such as a solid oxide fuel cell, having an array of oxidant inlets 114 and at least one oxidant outlet 116, as shown in FIGS. 3, 4 and 5.

A housing 118 surrounds the fuel cell 112 and bounds an insulation layer 120 that is positioned between the housing 118 and the fuel cell 112. Typically, insulation layer 120 comprises a rigid refractory material, such as a ceramic.

The insulation layer 120 defines an array of channels 122. A respective channel 122 within the array is matingly positioned adjacent to at least one respective inlet 114 for channeling oxidant flow to that respective inlet 114 from an oxidant supply feed 124. The typical arrangement comprises a respective channel 122 positioned adjacent to a respective inlet 114, however, this is not a limitation of this invention. In fact, other configurations contemplated by this invention include a single channel 122 channeling oxidant flow to multiple inlets 114 and multiple channels 122 channeling oxidant flow to a single inlet 114.

Figure 6:
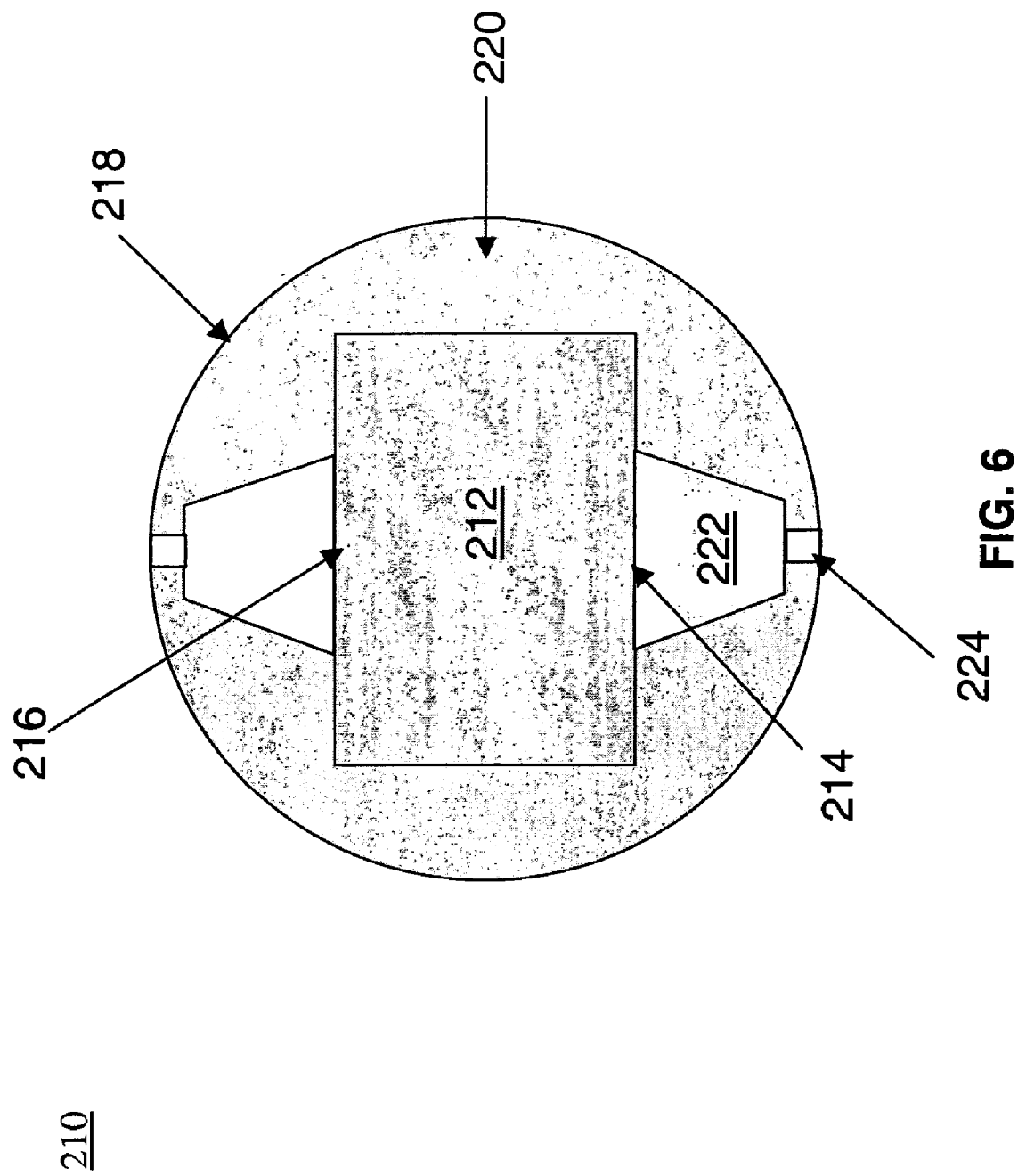
FIG. 6 is a schematic illustration of a fuel distribution system in accordance with one embodiment of the invention.

In another embodiment of the invention, a fuel distribution system 210 for a fuel cell assembly comprises a fuel cell 212, such as a solid oxide fuel cell, having at least one fuel inlet 214 and at least one fuel outlet 216, as shown in FIG. 6. A housing 218 surrounds the fuel cell 212 and bounds an insulation layer 220 that is positioned between the housing 218 and the fuel cell 212. Typically, insulation layer 220 comprises a rigid refractory material, such as a ceramic.

The insulation layer 220 defines at least a first cavity 222 adjacent to the at least one fuel inlet 214 for channeling fuel flow to the at least one fuel inlet 214 from a fuel supply feed 224.

While typical embodiments have been set forth for the purpose of illustration, the foregoing description should not be deemed to be a limitation on the scope of the invention. For example, while hybrid systems are depicted, simple systems are also encompassed within this invention. Accordingly, various modifications, adaptations, and alternatives may occur to one skilled in the art without departing from the spirit and scope of the present invention.

What is claimed is:

1. An oxidant distribution system for a fuel cell assembly comprising:
    a fuel cell having at least one oxidant inlet and at least one oxidant outlet;
    a housing surrounding said fuel cell; and
    an insulation layer interposed between said housing and said fuel cell, said insulation layer defining at least a first cavity adjacent said at least one oxidant inlet, wherein said insulation layer is an oxidant distributor for channeling oxidant flow to said at least one oxidant inlet of said fuel cell.

2. An oxidant distribution system in accordance with claim 1, wherein said system further comprises an oxidant supply feed in flow communication with said first cavity.

3. An oxidant distribution system in accordance with claim 2, wherein said first cavity is shaped such that a first portion of said first cavity adjacent said oxidant supply feed substantially mates with said supply feed and a second portion of said first cavity adjacent said oxidant inlet substantially mates with said oxidant inlet.

4. An oxidant distribution system in accordance with claim 3, wherein the cross-sectional size of said second portion is greater than the cross-sectional size of said first portion thereby creating a diffuser to distribute supplied oxidant more uniformly to said oxidant inlet of said fuel cell.

5. An oxidant distribution system in accordance with claim 1, wherein an internal surface of said first cavity is roughened to enhance turbulent flow therethrough.

6. An oxidant distribution system in accordance with claim 1, wherein said insulation layer comprises rigid refractory material.

7. An oxidant distribution system in accordance with claim 6, wherein said rigid refractory material comprises a ceramic.

8. An oxidant distribution system in accordance with claim 1, further comprising a second cavity defined by said insulation layer adjacent said at least one oxidant outlet for channeling oxidant flow from said at least one oxidant outlet.

9. An oxidant distribution system in accordance with claim 8, wherein said system further comprises an oxidant exit port disposed within said second cavity.

10. An oxidant distribution system in accordance with claim 9, wherein said second cavity is shaped such that a first portion of said second cavity adjacent said oxidant exit port substantially mates with said exit port and a second portion of said second cavity adjacent said oxidant outlet substantially mates with said oxidant outlet so as to channel oxidant flow from said fuel cell.

11. An oxidant distribution system in accordance with claim 10, wherein the cross-sectional size of said first portion is greater than the cross-sectional size of said second portion thereby creating a reducer to remove supplied oxidant from said oxidant outlet of said fuel cell.

12. An oxidant distribution system in accordance with claim 11, wherein an internal surface of said second cavity is roughened to enhance turbulent flow there through.

13. An oxidant distribution system in accordance with claim 1, wherein said fuel cell is a high temperature fuel cell in which waste heat generated by said fuel cell has a temperature in a range between about 600° C. to about 1300° C.

14. An oxidant distribution system in accordance with claim 1, wherein said fuel cell is a solid oxide fuel cell.

15. An oxidant distribution system for a fuel cell assembly comprising:
    a fuel cell having an array of oxidant inlets and at least one oxidant outlet;
    a housing surrounding said fuel cell; and
    an insulation layer interposed between said housing and said fuel cell, said insulation layer defining an array of channels, wherein a respective channel within said array is matingly positioned adjacent to at least one respective inlet, and wherein said insulation layer is an oxidant distributor for channeling oxidant flow to said at least one respective inlet of said fuel cell.

16. An oxidant distribution system in accordance with claim 15, wherein said system further comprises an oxidant supply feed in flow communication with said array of channels.

17. An oxidant distribution system in accordance with claim 15, wherein said insulation layer comprises rigid refractory material.

18. An oxidant distribution system in accordance with claim 17, wherein said rigid refractory material comprises a ceramic.

19. An oxidant distribution system in accordance with claim 15, wherein said fuel cell is a high temperature fuel cell in which waste heat generated by said fuel cell has a temperature in a range between about 600° C. to about 1300° C.

20. An oxidant distribution system in accordance with claim 15, wherein said fuel cell is a solid oxide fuel cell.

* * * * *